United States Patent [19]
Bezner et al.

[11] Patent Number: 6,066,355
[45] Date of Patent: May 23, 2000

[54] SOUP GARNISH

[75] Inventors: Klaus Bezner, Untergruppenbach-Unterheinriet; Horst Klukowski, Neuenstadt-Kochertuern, both of Germany

[73] Assignee: Bestfoods, Englewood Cliffs, N.J.

[21] Appl. No.: 09/006,703

[22] Filed: Jan. 14, 1998

[30] Foreign Application Priority Data

Jan. 21, 1997 [DE] Germany .................... 197 01 944

[51] Int. Cl.⁷ .............. A23L 1/221; A23L 1/40; A23J 1/00
[52] U.S. Cl. .......... 426/650; 426/656; 426/614; 426/589
[58] Field of Search .................. 426/650, 656, 426/614

[56] References Cited

U.S. PATENT DOCUMENTS

| | | |
|---|---|---|
| 4,237,145 | 12/1980 | Risman et al. . |
| 4,698,000 | 10/1987 | Thulin et al. ............ 425/133.1 |
| 4,888,192 | 12/1989 | Ramnarine ................ 426/448 |
| 5,296,247 | 3/1994 | Huang et al. ............. 426/283 |
| 5,736,181 | 4/1998 | Bezner et al. . |
| 5,759,602 | 6/1998 | Kobussen et al. ........ 426/241 |

FOREIGN PATENT DOCUMENTS

| | | |
|---|---|---|
| 168 255 B1 | 1/1986 | European Pat. Off. . |
| A1 236 134 | 9/1987 | European Pat. Off. . |
| 0 320 580 | 9/1988 | European Pat. Off. . |
| 469 176 B1 | 4/1995 | European Pat. Off. . |
| 98 10 0927 | 1/1999 | European Pat. Off. . |
| 1441342 | 7/1974 | United Kingdom . |

*Primary Examiner*—Anthony J. Weier
*Attorney, Agent, or Firm*—Norris, McLaughlin & Marcus

[57] ABSTRACT

Storable, royale-like soup garnishes for dry soups are prepared by concentrically co-extruding two paste compositions which are different in color and or flavor. The product is a structurally uniform protein sponge. Each of the two paste compositions contains native protein, raising agent, filler and at least 10% by weight water. Following co-extrusion, the extrudate is subjected to a heat treatment for developing the protein sponge. It is then sliced to form small pieces and the pieces are dried.

6 Claims, 1 Drawing Sheet

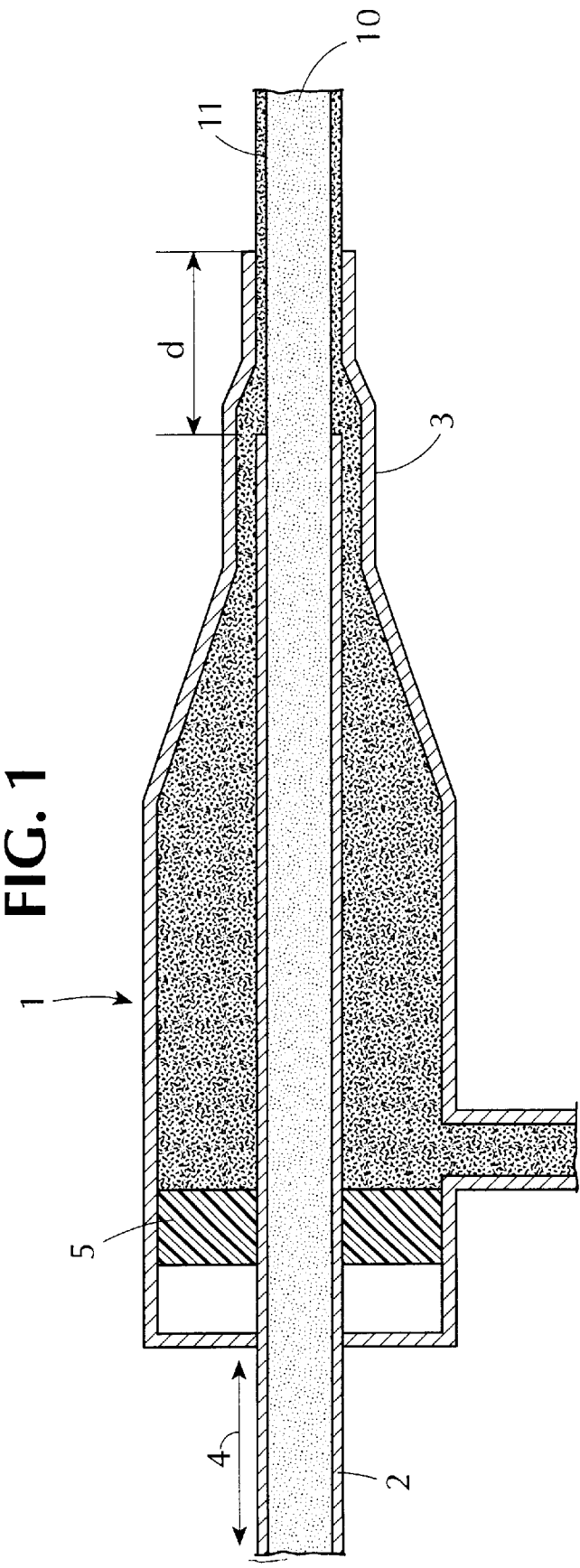

SOUP GARNISH

BACKGROUND OF THE INVENTION

The invention relates to soup garnishes based on the egg royale technique, in particular storable, royale-like soup garnishes for dry soups consisting of a structurally uniform protein sponge made of compositions obtained by coagulation of native protein and raising agent. The invention further relates to a process for the production of such soup garnishes and an extrusion nozzle for carrying out the process.

The soup garnish of the invention is a product dry in all components having high storage stability without cooling, short rehydration time and adequate stability to boiling.

Many soup garnishes on the market are semimoist products which must be stored frozen until preparation. Known products are filled and moist or dried noodle products such as wonton and Pirojhok or Ravioli, Tortellini and Manicotti, with only the first-mentioned being produced by coextrusion, the others by folding or injection. In the case of these known products, there is a clear distinction in consistency and composition of casing and filling, which also means, inter alia, that the filling remains completely enclosed by the casing until consumption. The soup garnishes of the invention are distinguished from these known products by the fact that they consist of a structurally uniform composition, the filling being open to both sides. The different filling and casing paste compositions of the soup garnishes of the invention differ in flavor and/or color, but both consist of a protein sponge, and therefore represent a structurally homogeneous product, so that there is also no risk that the exposed filling will escape from the casing.

Swiss Patent 644253 discloses a process for the production of foods which contain coagulating proteins and an apparatus for carrying out this process. In this process, two or more concentric tubes can be used and various materials can be coagulated therewith so as to layer one over the other. In this manner, egg rolls are produced, for example, which consist of a coagulated egg yolk core with a casing of coagulated egg white.

EP-A1-236134 discloses an extrusion nozzle for the extrusion of a paste, an outer expanded paste layer being coextruded with two filling materials.

EP-B1-168255 describes a process and an apparatus for coaxial extrusion for the formation of a continuous food product having different inner and outer components. In the case of the extrusion nozzle used here, the inner extrusion orifice is slightly offset towards the interior with respect to the outer extrusion orifice.

A product corresponding in structure to a protein sponge is royale known from cuisine, a soup garnish made of whisked, seasoned egg composition which has been made to set in a water bath. In hot stock, the royale is intended to retain its generally diced shape and not to disintegrate or fall apart immediately. EP-B-469 176 discloses a process for producing a dehydrated coagulated product in which the starting material is dehydrated to a dry matter content of greater than 90% under conditions which are suitable to give the starting material a porous structure, whereupon the dehydrated material is coagulated by treatment with moist air, with retention of the initial porosity. The starting product can comprise an egg base which is coagulated by this process. On the one hand, dehydrating such a starting material without coagulation is difficult and, moreover, coagulation of a starting material having a dry matter content of greater than 90% does not result in a satisfactory royale.

The applicant's German Patent Application 195 35 581.4 describes a process for producing royale by coagulation of a composition containing whole egg, a premix containing more than 10 percent by weight of moisture being produced from milk powder, whole egg, raising agent and seasonings, this being agglomerated and applied in thin sheeting compressed by a roller to a steam belt on which the composition layer is treated with hot steam for a time sufficient for coagulation of the egg white to take place, whereupon the homogeneous royale composition formed is diced and the dice are dried.

A process using different paste compositions which nevertheless have a structurally uniform protein sponge structure has not been disclosed to date.

BRIEF DESCRIPTION OF THE DRAWING

FIG. I is a section view of the extrusion nozzle of the invention.

DETAILED DESCRIPTION OF THE INVENTION

In its particularly preferred embodiment, the present invention discloses a storable soup garnish resembling royale in structure for dry soups which consists of two paste compositions different in color and/or flavor which are combined, concentrically with one another to give a structurally uniform protein sponge.

In the process of the invention, two different extrudable pastes containing native protein, raising agent, filler and at least 10% by weight of water and having a viscosity of 5.0–20.0 kPas, preferably 8.0–12.0 kPas, are produced, these are coextruded through a nozzle to form a rod, the rod is subjected to a heat treatment for developing the protein sponge, and it is then sliced to form small pieces, whereupon these are dried.

The native protein used is egg white, preferably hen's egg white, milk protein or wheat gluten. The native protein can be used in an amount of, for example, 6–12 percent by weight of the wet paste.

Suitable fillers are maltodextrin, milk powder, starch and/or various pureed vegetables and vegetable powders, for example broccoli puree, spinach flour, tomato concentrate etc. For flavoring, various herbs, meat and egg yolk can additionally be used.

It is expedient to produce both pastes using a uniform protein sponge dry premix to which the specific additives giving the color and/or flavor are then admixed.

An adequate but not excessive amount of water is necessary. The amount of water must be high enough to obtain an extrudable wet paste. The more liquid the paste is, the easier the extrusion is, and the better and the more uniform is the foaming on steaming. On the other hand, the amount of water must also not be excessive, so that the rod does not run and a skin which decreases the sliceability of the rod does not form on the product surface during the subsequent steaming, since, on the one hand, a solid and gas-tight surface formed during coagulation of the protein is desired to prevent escape of gas during foaming, but on the other hand the surface layer (skin) must not be too solid and make slicing the soft product difficult. Generally, the amount of water is 10–50 percent by weight, preferably 30–40 percent by weight, of the wet paste.

The amount of water also influences the viscosity of the paste and, from this aspect, must be chosen so that the viscosity is 5.0–20.0, preferably 8.0–12.0, kpas. If the viscosity is below 5.0 kpas, the paste is generally too liquid to be processed without problems arising.

The viscosity measurements were carried out using a CS10 rheometer from the Bohlin company.

| Measurement type: | Oscillation measurement in the viscoelastic range |
|---|---|
| Measurement geometry: | Plate-plate 20 mm (PP20), measurement gap 2 mm |
| Measurement settings: | strain 0.001*) frequency 0.1–10 Hz, in particular 2 Hz Temperature 25° C. |

*)In order to operate in the viscoelastic range, i.e. nondestructively, a "stress sweep" load measurement was performed. The measurements were taken at a deformation (= strain) of 0.001.

A suitable raising agent, which is generally added in an amount of 0.5–2.5 percent by weight of the wet paste, is a mixture of bicarbonate and tartaric acid and all other substances and mixtures of substances which can develop gas by a chemical reaction under the influence of moisture and/or heat. The gas formed in fine bubbles expands the composition and the sponge structure is formed. The raising agents known to those skilled in the art comprise, in particular, a mixture of sodium hydrogen carbonate and an acidulant, for example tartaric acid.

A suitable premix contains, for example, 25–50 percent by weight, preferably 35–45 percent by weight, of milk powder, preferably whole milk powder, 2–8 percent by weight, preferably 4–5.5 percent by weight, of dried egg white, 20–50 percent by weight, preferably 35–45 per cent by weight of egg yolk, preferably hen's egg yolk in natural liquid form, 3–25 percent by weight of starch, preferably 8–14 percent by weight of native cereal starches, 0.5–2.5 percent by weight, preferably 1–2 percent by weight, of raising agent and desired seasoning, flavoring and/or coloring additives.

After production of the wet paste, this is subjected to extrusion as soon as possible and before the raising agent begins to act. The raising agent should not begin to act completely until after the extrusion during the heat treatment.

The rod is heat treated, e.g., in a steam tunnel with saturated steam at atmospheric pressure, in a baking oven with added steam or in a microwave tunnel. As a result of the heating the rod expands and the proteins coagulate to give an elastic, sliceable, sponge-like composition.

After the heat treatment, the rods can be sliced by circular blades or in another manner. During the slicing, longer or shorter disc-like shapes are formed as desired in accordance with the desired application.

Slicing the rod prior to the heat treatment into the desired shape and size (e.g. cylindrical sections) is generally not expedient, since, during the heat treatment with steam, a dense skin with low water permeability of protein and/or gelatinized starch forms on the surface, which skin seals the entire particle water-tightly, which is not in the interest of a quick-cooking soup garnish. The drying subsequent to the steaming and later rehydration of the end product is made substantially more difficult. In contrast, in the case of the procedure of the invention, after the heat-treated rod is sliced, the cut surfaces of the cylindrical sections remain porous and have optimum drying and rehydration behavior.

If it is desired to slice the rod prior to the heat treatment step, formation of the surface skin must be prevented. The surface skin may be diminished prior to the steaming process, e.g. by intensive dusting with maltodextrin, lactose and/or beet sugar, and by incorporation of fat flakes or fat granules into the paste to be extruded.

The sliced rod pieces are dried to a residual moisture of 2–12 percent by weight, preferably 3–6 percent by weight. The drying to a residual moisture of generally below 0.2 aw guarantees the storability of the product without cooling. (aw=water activity=ratio of vapor pressure of the water-containing medium to vapor pressure of pure water).

It is of importance in the production of the product of the invention and ultimately decisive for quality that separation of casing and filling is prevented. Therefore, for an optimal union between casing and filling, not only are the same base formula, he same paste consistency and the same extrusion pressure required, but also recompression of the coextruded rod is required. Thus excessive and uneven compression of the composition during coextrusion leads to an enduring separating layer at the interfaces of filling and casing.

Preferably, the recompression is carried out in such a manner that, after combining the paste components, the finished rod is forced through a special extrusion nozzle which is illustrated in FIG. I. The filled rod (the coextrudate) is conducted for this purpose through the extended tapering outer extrusion casing tube.

In the case of a concentric arrangement of the paste compositions, this can be achieved by means of the fact that a nozzle 1 consisting of two concentric tubes is used, by means of which nozzle the two paste compositions are coextruded to form a rod, in which one paste forms the concentric core 10 and the other paste forms the sheath 11 arranged around the core, the inner paste core 10, after it has left its extrusion tube 2, is further conducted, together with the paste sheath 11, through the outer extrusion tube 3, which tapers downstream at the end of the inner extrusion tube 2. This is enabled by a nozzle 1 consisting of two concentrically arranged extrusion tubes, the inner extrusion tube 2 ending at a distance d upstream of the end of outer extrusion tube 3. The distance d should be at least 1.5 times, preferably at least 2 times, the diameter of the inner extrusion tube 2.

It has further proved to be expedient to design the extrusion nozzle 1 in such a manner that the inner extrusion tube 2 and the outer extrusion tube 3 are movable with respect to ore another in the direction of the axis of extrusion as illustrated by arrow 4, so that the extrusion gap of the outer extrusion tube 3 can be set in association with the tapering of the outer extrusion tube 3. By this means, the ratio of the paste casing thickness to the filling can be changed in a desired manner. Gasket 5 allows for such movement while preventing leakage.

In the form shown in FIG. I, the inner extrusion tube 2 which can be moved in the directions of arrow 4 has an inner diameter of 8 mm, and the outer extrusion tube 3 initially has an inner diameter of about 40 mm, then 12 and finally an inner diameter of 8 mm. The variable distance d between the end of the inner extrusion tube 2 and the end of the outer extrusion tube 3 is about 32 mm in a most preferred embodiment, that is 4 times the diameter of the inner extrusion tube 2.

EXAMPLES

The invention is described in more detail by the examples below.

| For the following examples, a dry premix (standard) of the following constituents was used: | | |
|---|---|---|
| Dry premix: (standard) | Whole milk powder | 55 parts by weight |
| | Wheat starch | 17 parts by weight |
| | Maltodextrin | 16 parts by weight |
| | Hen's egg white powder | 10 parts by weight |
| | Baking powder | 2 parts by weight |
| | Total | 100 parts by weight |

Example 1

| The following mixtures were used for casing and filling: | | |
|---|---|---|
| Casing: | Dry premix | 100 parts by weight |
| | Egg yolk, liquid | 40 parts by weight |
| | Water | 12 parts by weight |
| | Total | 152 parts by weight |
| Filling: | Dry premix | 100 parts by weight |
| | Spinach flour* | 2 parts by weight |
| | Broccoli purée** | 55 parts by weight |
| | Total | 157 parts by weight |

*Commercial spinach, dried, ground to <125 μm
**Fresh brocoli, comminuted in the frozen state on a grater, moisture 89%

The pastes prepared with the above mixtures were extruded through the nozzle shown in FIG. I.

The heat treatment was performed with saturated steam for 12 minutes. The rod was sliced to form 5 mm wide discs which were dried to an aw below 0.2 in a hot-air dryer at 70° C. The process gave an attractive storable structurally uniform product of a yellowish sheath and greenish core, which product rehydrated in hot water in 3–5 minutes to give a ready-to-eat consistency but which remained stable to boiling.

Example 2

| The following mixtures were used for casing and filling. | | |
|---|---|---|
| Casing: | Dry premix | 100 parts by weight |
| | Tomato concentrate*** | 40 parts by weight |
| | Water | 10 parts by weight |
| | Total | 150 parts by weight |
| Filling: | Dry premix | 100 parts by weight |
| | Primerba herb fat**** | 30 parts by weight |
| | Water | 28 parts by weight |
| | Total | 158 parts by weight |

***3-fold concentrated (DM = 36–38%)
****vacuum-drying stabilized fat paste of ground nut and sunflower seed fat containing selected herbs from Provence.

The pastes prepared from the mixtures were processed as in Example 1 and gave a comparable product.

What is claimed is:

1. Storable royale-like soup garnishes for dry soups consisting of two paste compositions of different color and/or flavor concentrically joined together in the form of a structurally uniform protein sponge said soup garnish having a residual moisture content after drying of 2 to 12 percent by weight.

2. The soup garnish of claim 1 having a water activity after drying of less than 0.2.

3. The soup garnish of claim 1 wherein each of said paste compositions contain native protein, raising agent, filler and water.

4. The soup garnish of claim 3 wherein said native protein is selected from the group consisting essentially of egg white, milk protein and wheat gluten.

5. The soup garnish of claim 3 wherein said filler is selected from the group consisting essentially of maltodextrin, milk powder, starch, pureed vegetables, vegetable powders, herbs, meat, egg yolk and mixtures thereof.

6. The soup garnish of claim 3 wherein said raising agent is a mixture of bicarbonate and an acidulent.

* * * * *